ated Nov. 3, 2020

United States Patent
Zheng et al.

(10) Patent No.: US 10,827,094 B2
(45) Date of Patent: Nov. 3, 2020

(54) READING APPARATUS

(71) Applicant: Brother Kogyo Kabushiki Kaisha, Nagoya (JP)

(72) Inventors: Jie Zheng, Nagoya (JP); Kunihiro Amano, Kitanagoya (JP); Kazushi Shumiya, Konan (JP); Seiya Sato, Yokkaichi (JP); Kentaro Aoyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/750,453

(22) Filed: Jan. 23, 2020

(65) Prior Publication Data

US 2020/0252522 A1 Aug. 6, 2020

(30) Foreign Application Priority Data

Jan. 31, 2019 (JP) .................... 2019-016374

(51) Int. Cl.
*H04N 1/04* (2006.01)
*H04N 1/407* (2006.01)
*H04N 1/401* (2006.01)
*H04N 1/00* (2006.01)

(52) U.S. Cl.
CPC ....... *H04N 1/4072* (2013.01); *H04N 1/00018* (2013.01); *H04N 1/401* (2013.01)

(58) Field of Classification Search
CPC ... H04N 1/4072; H04N 1/00018; H04N 1/401

USPC .......................................... 358/461; 382/274
See application file for complete search history.

(56) References Cited

U.S. PATENT DOCUMENTS 6,704,457 B1 * 3/2004 Sugiura ............... H04N 1/4076
358/406

FOREIGN PATENT DOCUMENTS

| JP | H08-037597 A | 2/1996 |
| JP | 2001-245147 A | 9/2001 |
| JP | 2002-027247 A | 1/2002 |

* cited by examiner

*Primary Examiner* — Cheukfan Lee
(74) *Attorney, Agent, or Firm* — Burr & Brown, PLLC

(57) ABSTRACT

A reading apparatus, having a document supporting part, a reader, a driving mechanism, a reference density plate, and a controller, is provided. The controller controls the reader to perform a first reading action to read the reference density plate at a first position and adjust an amount of light, controls the reader to perform a second reading action under the light in the adjusted amount and create correction data for shading correction, controls the driving mechanism to move the reader from the first position toward a standby position, controls the reader while being moved from a second position toward a third position to perform a third reading action including a plurality of reading actions under the light in the adjusted amount, and inspects validity of the correction data by comparing read data obtained from signals resulted from the plurality of reading actions.

10 Claims, 6 Drawing Sheets

READING APPARATUS

CROSS REFERENCE TO RELATED APPLICATION

This application claims priority from Japanese Patent Applications No. 2019-016374, filed on Jan. 31, 2019, the entire subject matters of which are incorporated herein by reference.

BACKGROUND

Technical Field

An aspect of the present disclosure is related to a reading apparatus.

Related Art

A flatbed reading apparatus capable of reading an image of an original document is known. The reading apparatus may have a line reader arranged at a position underneath a transparent document supporting plate. The line reader may read a line of the image, extending along a main scanning direction, in the original document and move in a sub-scanning direction to read further lines of the image line by line. Thus, by reading the original document line by line, an image in an entire readable range in the original document may be read.

In the known reading apparatus, in order to adjust an amount of light to be emitted at the original document and to create correction data for shading correction to remedy inevitable uneven errors in color density among pixels due to characteristics of an optical system, a reference density plate, which includes a plate in white, may be provided at a position different from the document supporting plate, and the line reader may read the light reflected on the reference density plate to adjust the light amount and create the correction data. Meanwhile, the reference density plate may have dust and/or smears adhered thereon, and in order to reduce influence from the dust or the smears, the line reader may read a plurality of lines of the image of the reference density plates, and image data obtained from the plurality of lines in the reference density plate may be processed on the basis of pixels located at a same position in the main scanning direction to obtain an average value or a maximum value to create the correction data therefrom.

SUMMARY

The line reader that reads a plurality of lines of the reference density plate while moving may read the reference density plate at positions different from a reading position where the line reader reads an image for adjusting the light amount. In other words, the positions for the line reader to work for creating the correction data and the position to work for adjusting the light amount are different. In this regard, reliability of the correction data may not be secured. In order to overcome the deficiency, movement of the reader may be controlled such that the line reader may repeat adjusting the light amount and reading the reference density plate for a line for a plurality of time at different positions to create the correction data each time under the adjusted light amount. In this regard, the line reader may be repeatedly moved and stopped for a plurality of times, and the light amount may be adjusted for the plurality of times; therefore, a waiting time for creating the correction data may be extended.

The present disclosure is advantageous in that a reading apparatus, in which a waiting time for creating correction data may be shortened while the correction data may be restrained from being affected by dust or smear on a reference density plate, is provided.

According to an aspect of the present disclosure, a reading apparatus, having a document supporting part, a reader, a driving mechanism, a reference density plate, and a controller, is provided. The document supporting part includes a plane surface for supporting an original document. The reader is arranged on a side of the document supporting part opposite to the plane surface. The reader includes a light source configured to emit light at a reading object and an image sensor configured to convert the light reflected on the reading object into signals. The reader is configured to read a line of the reading object. The driving mechanism is configured to move the reader in parallel to the plane surface. The reference density plate is arranged at a position different from the document supporting part in a moving direction for the reader to be moved. The controller is configured to control the reader located at a first position to perform a first reading action to read the reference density plate being the reading object and adjust an amount of the light from the light source in accordance with the signals resulted from the first reading action and output from the reader; control the reader located at the first position to perform a second reading action to read the reference density plate under the light emitted in the adjusted amount from the light source and create correction data for shading correction based on the signals resulted from the second reading action and output from the reader; and control the driving mechanism to move the reader from the first position through a second position and a third position toward a standby position, the standby position being located to be closer than the first position to the document supporting part, control the reader while being moved from the second position toward the third position to perform a third reading action, the third reading action including a plurality of reading actions to read the reference density plate being the reading object for a plurality of times under the light emitted in the adjusted amount from the light source, and inspect validity of the correction data having been created by comparing read data obtained from the signals resulted from the plurality of reading actions in the third reading action and output from the reader.

BRIEF DESCRIPTION OF THE ACCOMPANYING DRAWINGS

DETAILED DESCRIPTION

In the following paragraphs, described with reference to the accompanying drawings will be an embodiment of the present disclosure. It is noted that various connections may be set forth between elements in the following description. These connections in general and, unless specified otherwise, may be direct or indirect and that this specification is not intended to be limiting in this respect. It will be understood that those skilled in the art will appreciate that there are numerous variations and permutations of a reading apparatus that fall within the spirit and scope of the invention.

<Multifunction Peripheral>

Figure 1:
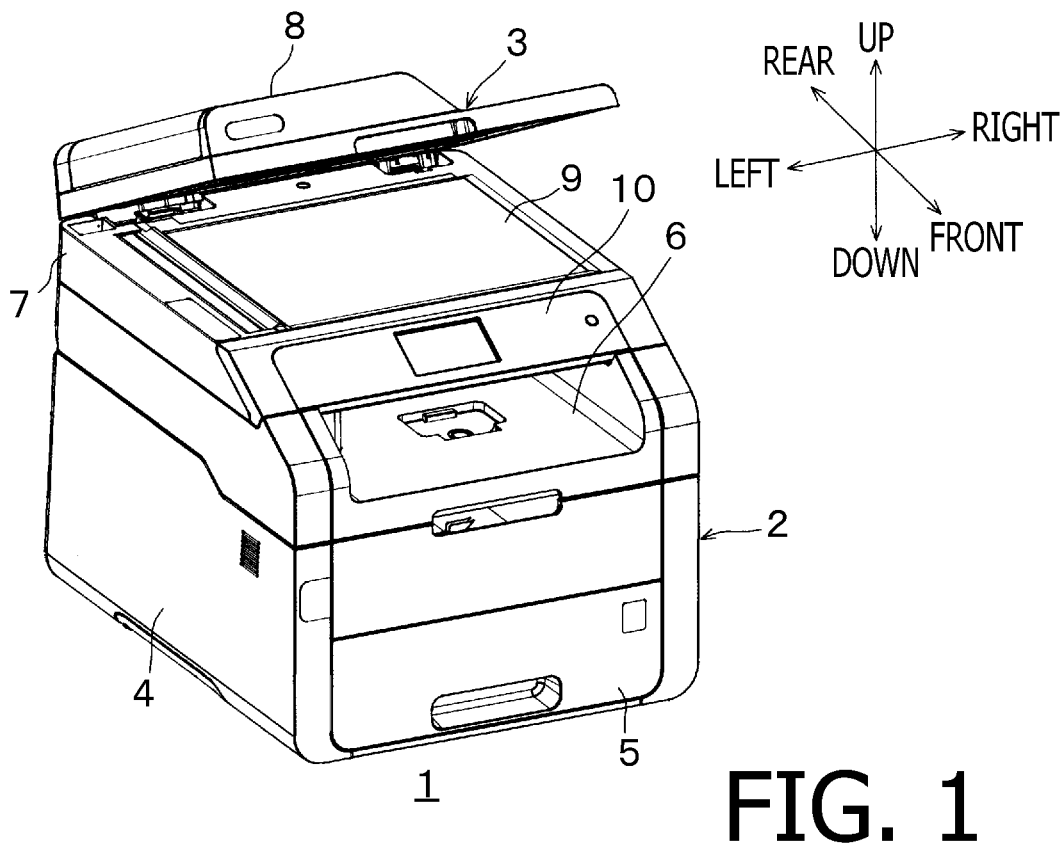
FIG. 1 is a perspective view of a multifunction peripheral having a reading apparatus, with an auto-document feeder (ADF) being at an open position, according to an embodiment of the present disclosure.

FIG. 1 illustrates a multifunction peripheral (MFP) 1 according to the embodiment of the present disclosure. The MFP 1 is an electronic device having a plurality of functions including a printing function and a scanning function. The printing function is a function to form an image related to image data on a sheet. The scanning function is a function to scan an image of an object and create image data related to the read image. The MFP 1 includes a printer 2 to provide the printing function and a scanner 3 to provide the scanning function.

The printer 2 includes a printer casing 4, which has an approximate shape of a rectangular solid. At a lower position in the printer casing 4, arranged is a feeder tray 5, which may be drawn outward from or pushed inward through a side of the printer casing 4. The feeder tray 5 may store and support a stack of sheets therein.

In the following paragraphs, positional relation within the MFP 1 and each part or item included in the MFP 1 will be mentioned on basis of the orientation of the MFP 1 as indicated by arrows in FIGS. 1-2. For example, the side of the printer casing 4, from which the feeder tray 5 may be drawn outward from the printer casing 4, will be called as a "front side," and a side opposite to the front side will be called as a "rear side." Moreover, a right-hand side and a left-hand side to a user who faces the front side of the MFP 1 are defined as a rightward side and a leftward side, respectively. A right-to-left or left-to-right direction may be called as a widthwise direction, a front-to-rear or rear-to-front direction may be called as a front-rear direction, and a direction orthogonal to the widthwise direction and the front-rear direction may be called as an up-down direction or a vertical direction. An upper side and a lower side of the MFP 1 will be referred to based on a condition, in which the MFP 1 is set on a horizontal plane.

In order to form images on sheets by the printer 2, the sheets are fed from the feeder tray 5 one by one and conveyed inside the printer casing 4, and an image forming device (not shown) in the printer casing 4 may form either multicolored or monochrome images on the sheets being conveyed. The image forming device may form images in, for example, electro-photographic printing or in inkjet printing. The sheets with the images formed thereon may be ejected outside the printer casing 4 to rest on an ejection tray 6, which is formed on an upper side of the printer casing 4.

<Scanner>

The scanner 3 is arranged at an upper position with respect to the printer 2. The scanner 3 includes a scanner casing 7 and an auto-document feeder (ADF) 8. The scanner 3 includes a transparent plate 9, which forms an upper face of the scanner casing 7. The ADF 8 is movable between an open position and a closed position. When the ADF 8 is in the closed position, the transparent plate 9 is covered by the ADF 8. When the ADF 8 is in the open position, the transparent plate 9 is exposed. In other words, the ADF 8 may serve as a cover to open or close the transparent plate 9.

Figure 2:
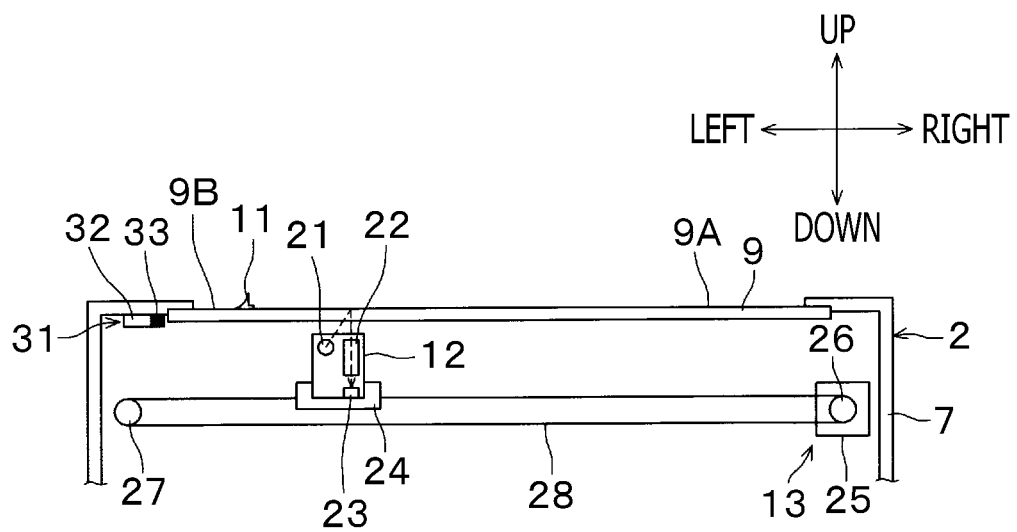
FIG. 2 is an illustrative cross-sectional view of the reading apparatus according to the embodiment of the present disclosure.

At a leftward position on the transparent plate 9, as shown in FIG. 2, arranged spaced apart from a leftward edge of the transparent plate 9 is a guide member 11 extending in the front-rear direction. The guide member 11 has a plane surface, facing rightward and spreading in the front-rear and the vertical direction, and an arced surface, of which center is located at an upper-leftward position with respect to the guide member 11. The scanner 3 may read an image of an original document in either a flatbed (FB) mode or an ADF mode. The transparent plate 9 has an upward plane surface, which includes an area 9A and an area 9B. The transparent plate 9 may support an original document on the area 9A, which is a leftward area from the guide member 11, when the original document is read in the FB mode. On the other hand, when an original document is read in the ADF mode, the original document may pass over the area 9B, which is on a leftward side with respect to the guide member 11.

In order read an original document in the FB mode, the ADF 8 may be placed at the open position, and the original document may be placed in the area 9A on the upper surface of the transparent plate 9. In particular, the original document may be placed in such an arrangement that a leftward edge of the original document contacts the rightward surface of the guide member 11, and a rearward edge of the original document overlaps a rearward edge of the area 9A. After placing the original document in this arrangement, the ADF 8 may be placed in the closed position, and, with the original document being covered by the ADF 8 from above, an image on a surface of the original document that contacts the transparent plate 9 may be read.

In order read an original document in the ADF mode, on the other hand, the original document may be set in a document placement area (not shown) in the ADF 8. An original document, which may include one or more sheets, may be fed one by one, conveyed over the area 9B on the transparent plate 9, and ejected to rest in an ejection area (not shown) in the ADF 8. As the original document passes over the transparent plate 9, an image on a surface of each sheet may be read.

Inside the scanner casing 7, underneath the transparent plate 9, arranged are a contact image sensor (CIS) unit 12 and a moving mechanism 13.

The CIS unit 12 is provided with a light source 21, a rod lens array 22, and an image sensor 23. The image sensor 23 includes, for example, a linear image sensor, in which a plurality of light receiving elements are arrayed in a main scanning direction, e.g., the front-rear direction.

When the original document placed on the transparent plate 9 is to be read, light may be emitted from the light source 21 at the transparent plate 9. The light reflected on the original document placed on the transparent plate 9 may enter the rod lens array 22 and forms an image on the image sensor 23 through the rod lens array 22. Thereby, a line of image on a reading object, e.g., the original document, may be read along the main scanning direction, which is the front-rear direction in the scanner 3. The position of the image sensor 23 to read the line of image will be called as a reading position.

Moreover, in the following paragraphs, an action by the CIS unit 12 to read a line of image at a reading position may be called as a "reading action".

Through the reading action, the light receiving elements in the image sensor 23 may output photoelectrically converted voltages. The voltages output from the light receiving elements may be amplified through a gain control circuit and converted through an A/D conversion circuit into digital pixel values. The A/D conversion circuit may have a resolution of, for example, 8 bit (0-255) and converts voltages which are lower than a lower criterion voltage, or a lower limit value, uniformly into zero (0), and voltages which are higher than a higher criterion voltage, or an upper limit value, uniformly into 255. Meanwhile, voltages which fall in a range between the lower limit value and the upper limit value are converted by the A/D conversion circuit into pixel values corresponding to largeness of the respective voltages.

The moving mechanism 13 may move the CIS unit 12 in a sub-scanning direction, e.g., the widthwise direction, which intersects orthogonally with the main scanning direction. The moving mechanism 13 includes a carriage 24, on which the CIS unit 12 is mounted, a motor 25 including a bi-directionally rotatable stepping motor, a driving pulley 26 which may be driven by the motor 25 to rotate, a driven pulley 27 paired with the driving pulley 26, and a belt 28 strained between the driving pulley 26 and the driven pulley 27. The driving pulley 26 is located at a rightward end area in the scanner casing 7 in an arrangement such that a rotation axis thereof extends in the front-rear direction. The driven pulley 27 is located at a leftward end area in the scanner casing 7 in an arrangement such that a rotation axis thereof extends in the front-rear direction. The carriage 24 is attached to the belt 28. The belt 28 may roll as the driving pulley 26 rotates, and the carriage 24 may move in the sub-scanning direction, e.g., the widthwise direction in the scanner 3, along a guide (not shown).

In the scanner casing 7, at a leftward position with respect to the transparent plate 9, arranged is a reference density plate 31. The reference density plate 31 is adhered to an inward and downward surface of the scanner casing 7 and extends in the front-rear direction. The reference density plate 31 has a white area 32, which occupies a larger or most part of the reference density plate 31, and a black area 33, which is arranged at each corner on one of the longitudinal edge of the reference density plate 31 extending in the front-rear direction closer to the transparent plate 9. In this arrangement, on each end of the longitudinal edge of the reference density plate 31 closer to the transparent plate 9, the black area 33 and the white area 32 adjoin each other along the sub-scanning direction. In other words, along the longitudinal edge of the reference density plate 31 extending in the front-rear direction and closer to the transparent plate 9, the white area 32 is interposed between the black areas 33.

Figure 3:
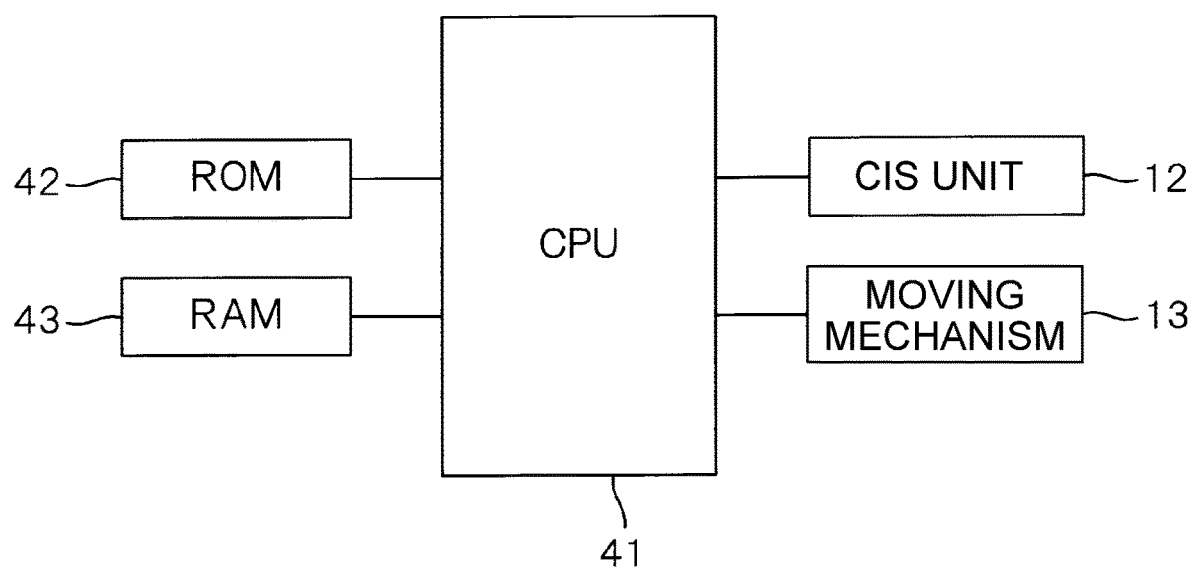
FIG. 3 is a block diagram to illustrate an electric configuration of the reading apparatus according to the embodiment of the present disclosure.

The scanner 3 further includes, as shown in FIG. 3, a central processing unit (CPU) 41, a read only memory (ROM) 42, and a random access memory (RAM) 43.

The CPU 41 executes programs for processing various types of information to control actions of components in the scanner 3 including the CIS unit 12 and the moving mechanism 13.

The ROM 42 includes a rewritable non-volatile memory such as a flash memory. The ROM 42 may store programs and data that may be executed or processed by the CPU 41.

The RAM 43 includes a volatile memory including, for example, dynamic random access memory (DRAM) and may serve as a work area when the CPU 41 executes the programs. The RAM 43 forms a step counter, which may increment a number of steps by one (1) each time the motor 25 rotates for a step. The CPU 41 may control the operation of the motor 25 based on the number of steps counted by the step counter to control the position of the CIS unit 12.

<Document Reading Process>

Figure 4A:
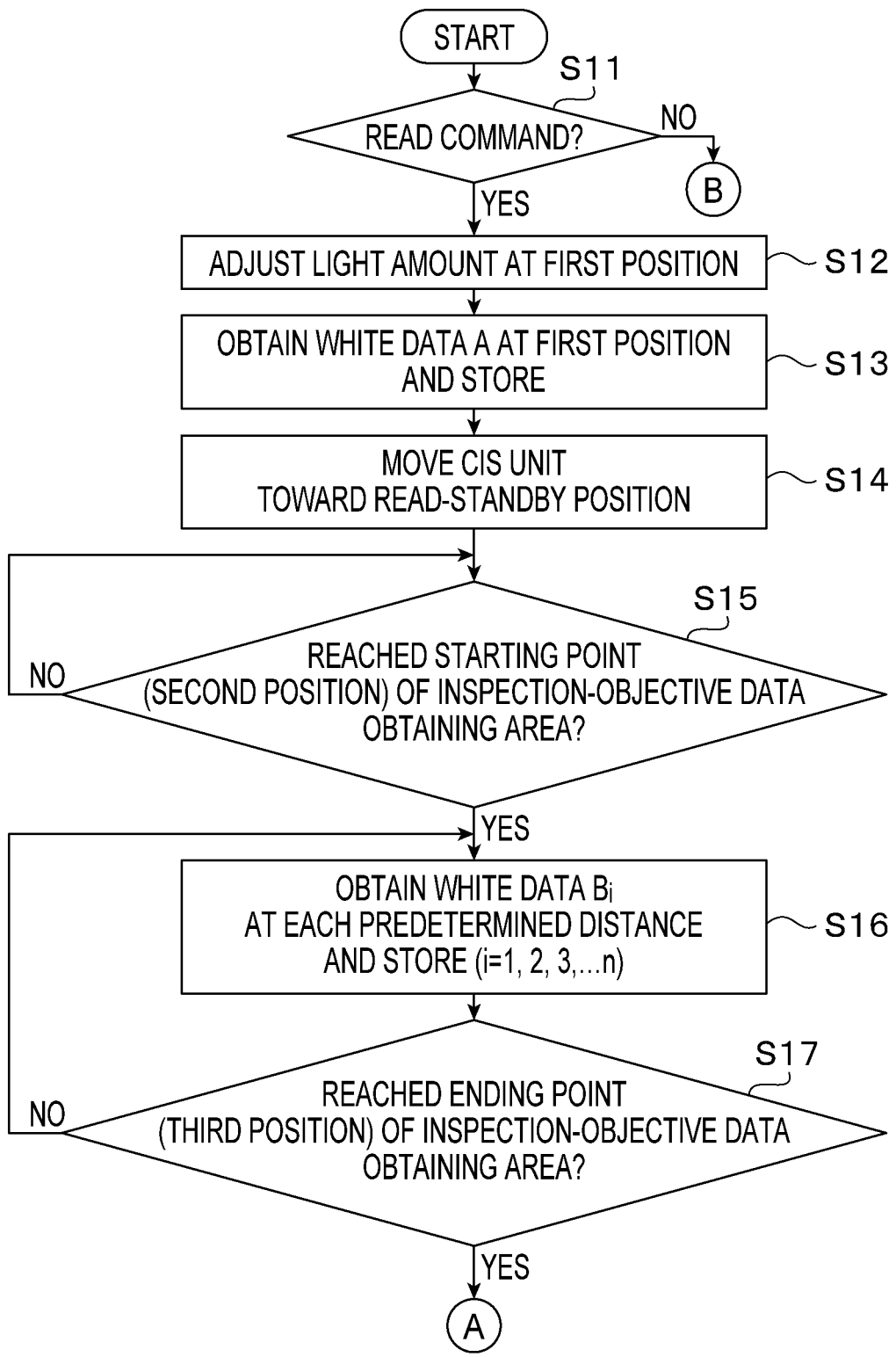
FIGS. 4A-4B are flowcharts to illustrate flows of steps in an image reading process to be executed in the reading apparatus according to the embodiment of the present disclosure.
Figure 4B:
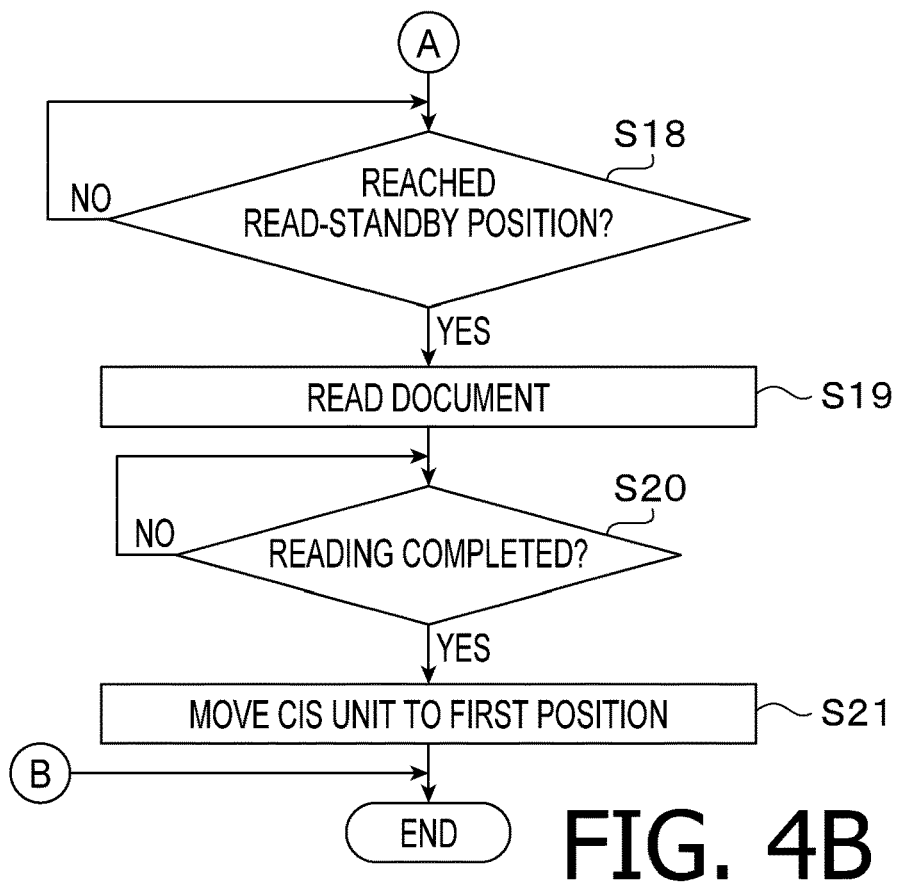

While the MFP 1 is powered, the CPU 41 may execute a document reading process as shown in FIGS. 4A-4B.

In the document reading process, in S11, the CPU 41 determines whether a command for reading a document is input in the MFP 1. The command for reading a document may be, for example, input in the MFP 1 by an operation to an operation panel 10 (see FIG. 1) arranged in the MFP 1. If no command for reading a document is input (S11: NO), the CPU 41 ends the document reading process, but after a lapse of a predetermined length of period, the CPU 41 repeats the document reading process and, in S11, determines whether a command for reading a document is input in the MFP 1.

Figure 5:
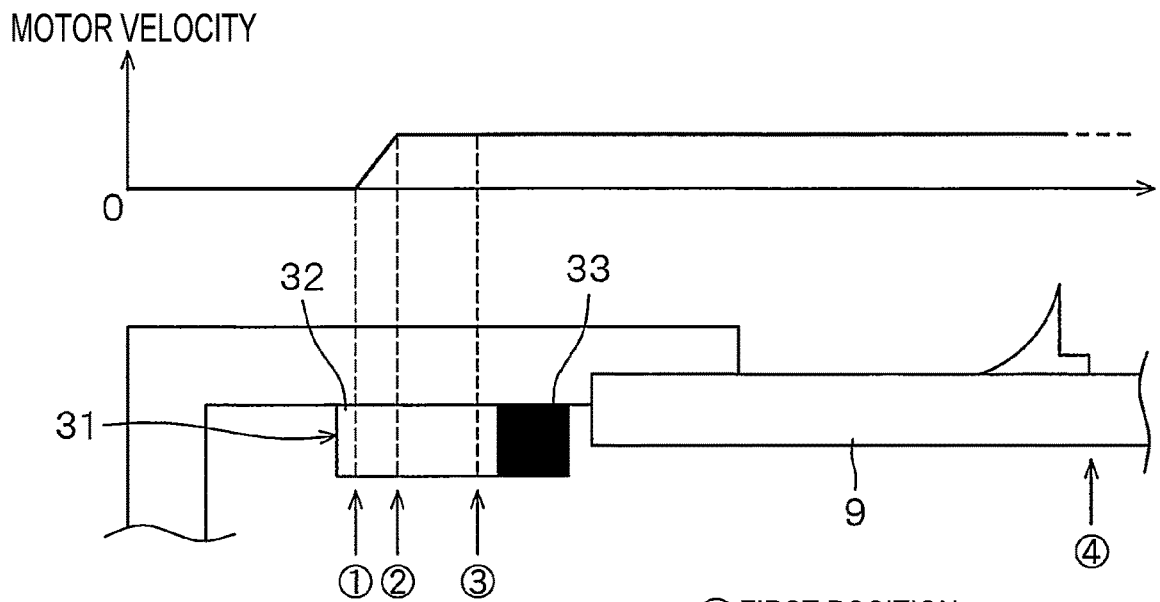
FIG. 5 illustrates locations of first, second, and third positions and a read-standby position in the reading apparatus according to the embodiment of the present disclosure.

If a command for reading a document is input in the MFP 1 (S11: YES), in S12, the CPU 41 adjusts the light amount while the CIS unit 12 is located at a first position. The first position is, as shown in FIG. 5, a position, at which the reading position for the CIS unit 12 to read an image is located in a leftward end range in the white area 32 of the reference density plate 31. For adjusting the light amount, the light source 21 in the CIS unit 12 is turned on, and the CIS unit 12, or the image sensor 23, reads the white area 32. The CPU 41 may adjust a current value of a current to be supplied to the light source 21 so that a maximum value in the pixel values for the pixels in the line obtained by the reading action may be set to a predetermined value, e.g., 254.

After adjusting the light amount, with the CIS unit 12 being maintained at the first position, in S13, the CPU 41 supplies the adjusted current value to the light source 21 and operates the CIS unit 12 to read the white area 32 in the reference density plate 31. Through this reading action, the image sensor 23 may output signals, i.e., voltages, and the signals may be converted into digital, to create white data A for the line corresponding to the first position. The CPU 41 stores the created white data A for the line in the ROM 42 as correction data for shading correction.

In S14, the CPU 41 controls the moving mechanism 13 to start moving the CIS unit 12 from the first position toward a read-standby position, which is a position where the CIS unit 12 starts reading the original document placed on the transparent plate 9. In other words, the read-standby position is located to be closer than the first position to the transparent plate 9. As the moving mechanism 13 moves the CIS unit 12, a motor velocity being a rotation velocity of the motor 25 is increased from zero (0) and thereafter maintained at a predetermined constant velocity, as indicted in FIG. 5. Meanwhile, a second position and a third position for the CIS unit 12 to move through are set in such an arrangement that a range, in which the CIS unit 12 moves from the second position to the third position, is included in a range, in which the motor velocity for the motor 25 having been accelerated is maintained at the constant velocity. In other words, the CIS unit 12 moving in the range between the second position and the third position is moved at a constant velocity corresponding to the constant velocity of the motor 25. The second position and the third position are stored in the ROM 42: in other words, information concerning the second position and the third position is stored in the ROM 42. The second position may be, for example, set at a position, at which the CIS unit 12 is located when the motor velocity reaches the constant velocity, or farther than that position toward the read-standby position. The third position is set at a position closer than the second position to the read-standby position and leftward with respect to a rightward end of the white area 32 in the reference density plate 31.

After the CIS unit 12 started moving, in S15, the CPU 41 determines whether the CIS unit 12 reached the second position, which is a starting position of an inspection-objective data obtaining area. If the CIS unit 12 has not reached the second position (S15: NO), the CPU 41 repeats S15 until the CIS unit 12 reaches the second position. Once the CPU 41 determines that the CIS unit 12 reached the second position (S15: YES), the CPU 41 controls the CIS unit 12 to read an image each time the CIS unit 12 moves for a predetermined distance, e.g., a distance corresponding to five (5) lines. The CPU 41 controls the CIS unit 12 to read images continuously until the CIS unit 12 reaches the third position, which is an ending position of the inspection-objective data obtaining area. In S16, the CPU 41 obtains white data Bi (i=1, 2, 3, . . . , n) for n lines contained between the second position and the third position and stores the obtained white data Bi in the ROM 42 as inspection-objective data. In the present embodiment, a distance between the second position and the third position is set to be approximately 4 mm; therefore, when a resolution in the sub-scanning direction is set at 300 dpi, and when the CPU 41 controls the CIS unit 12 to perform the reading action at each five (5) lines, the number n is 10 (n=10). In this regard, however, the number n may be increased by, for example, reducing a length of the black area 33 in the sub-scanning direction in order to increase the distance between the second position and the third position, or by, for another example, performing the reading action at each three (3) lines rather than five (5) lines.

In S17, if the CPU 41 determines that the CIS unit 12 reached the third position (S17: YES), the CPU 41 discontinues the reading action by the CIS unit 12. Further, the CPU 41 starts a correction data validity inspecting process. The correction data validity inspecting process may be conducted in parallel with the movement of the CIS unit 12 and discontinued before the CIS unit 12 reaches the read-standby position. The correction data validity inspecting process will be described further below.

In S18, the CPU 41 determines whether the CIS unit 12 reached the read-standby position. If the CPU 41 determines that the CIS unit 12 reached the read-standby position (S18: YES), in S19, the CPU 41 controls the CIS unit 12 and the moving mechanism 13 to start a reading action to read an image of the original document by the CIS unit 12. If the CPU 41 determines that the reading action by the CIS unit 12 is completed (S20: YES), in S21, the CPU 41 moves the CIS unit 12 to the first position and ends the document reading process.

<Correction Data Validity Inspecting Process>

Figure 6:
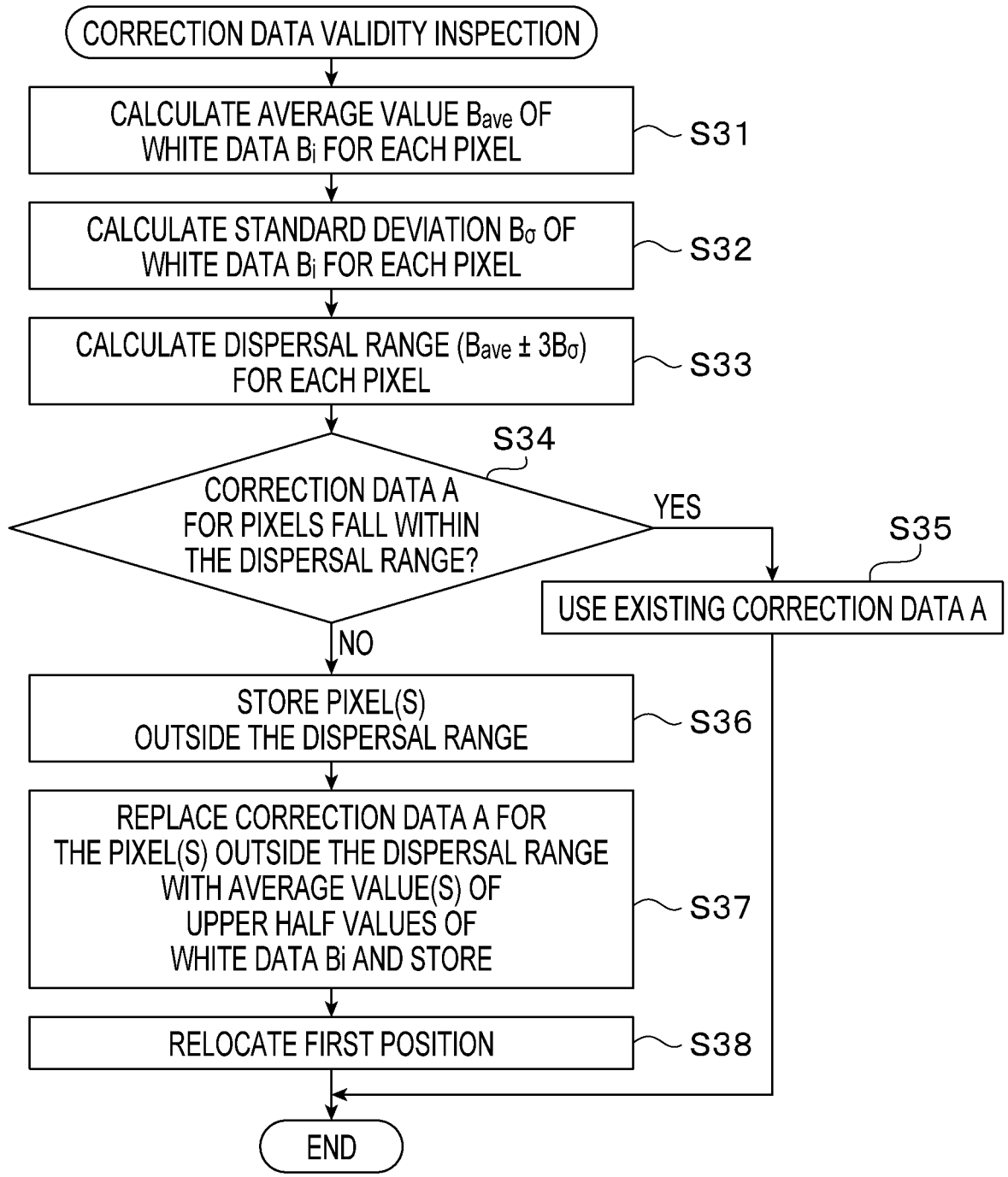
FIG. 6 is a flowchart to illustrate a flow of steps to be executed in a correction data validity-inspecting process in the reading apparatus according to the embodiment of the present disclosure.

The correction data validity inspecting process, as shown in FIG. 6, is conducted by the CPU 41 in parallel with the control of the CIS unit 12 to move from the first position to the read-standby position in the document reading process, or in particular, while the CIS unit 12 is moved from the third position to the read-standby position.

In the correction data validity inspecting process, in S31, the CPU 41 calculates an average value Bave of the pixel values in the white data Bi throughout the n lines for each of the pixels. In the following paragraphs, the white data Bi may be called as "inspection-objective data Bi." In S32, the CPU 41 calculates standard deviation B$\sigma$ of the values in the inspection-objective data Bi throughout the n lines for each of the pixels. In S33, the CPU 41 calculates a dispersal range of the inspection-objective data Bi throughout the n lines for each of the pixels. The dispersal range may be, for example, obtained by a formula: Bave±3 B$\sigma$.

In S34, the CPU 41 examines the white data A, which will be hereinafter called as "correction data A," for each of the pixels in the line saved in S13 in the ROM 42 to be used in shading correction and determines whether a value for each of the pixels in the correction data A falls within the dispersal range, e.g., Bave±3 B$\sigma$.

For a pixel with the correction data A falling in the dispersal range, the CPU 41 determines that the correction data A for the pixel is valid and usable in the shading correction. If the correction data A for all of the pixels in the line falls within the dispersal range, in S35, the CPU 41 determines that the correction data A stored in S13 in the ROM 42 to be usable in the shading correction, and the correction data validity inspecting process ends thereat.

In S34, on the other hand, for a pixel with the correction data A falling outside the dispersal range, the CPU 41 determines that the correction data A for the pixel is invalid. Hereinafter, the pixel with the correction data A falling outside the dispersal range may be called as "pixel outside the range." In S36, the CPU 41 stores the pixel outside the dispersal range in the ROM 42. In other words, the CPU 41 stores information to identify the pixel outside the dispersal range in the ROM 42. In S37, for each of the pixels outside the dispersal range stored in the ROM 42, the CPU 41 calculates an average value of upper half values in the inspection-objective data Bi, i.e., an average value between a maximum value and a midst value in the inspection-objective data Bi, and replaces the correction data A with the calculated average value. Thereby, new correction data A for a line, in which a part of the correction data A for the pixels outside the range is replaced with the average value of the upper half values in the inspection-objective data Bi, is stored in the ROM 42 to replace the existing correction data A. Thus, through S37, the new correction data A will be used for shading correction. Thereafter, in S38, the CPU 41 relocates the first position for the CIS unit 12 to obtain the correction data A to a next location and ends the data verification process.

<Data Obtaining Position Relocating Process>

Figure 7:
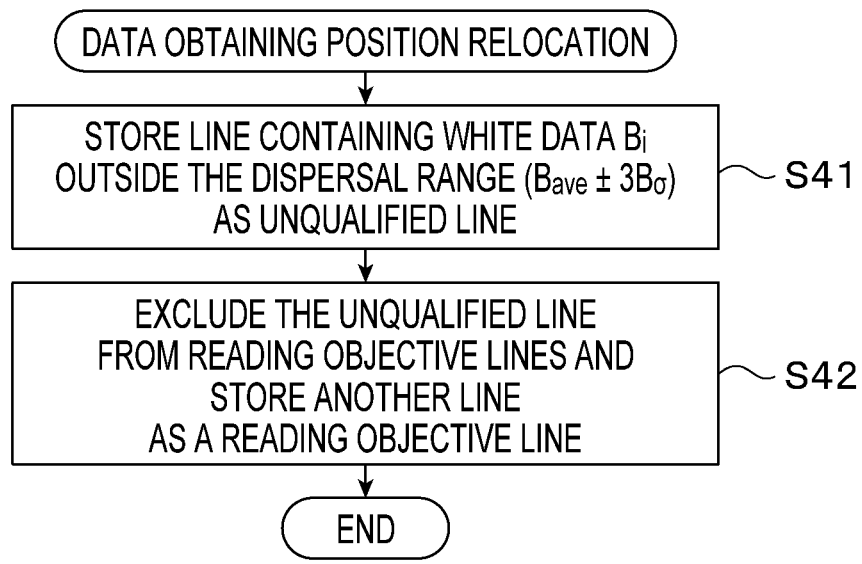
FIG. 7 is a flowchart to illustrate a flow of steps to be executed in a data obtaining position relocating process in the reading apparatus according to the embodiment of the present disclosure.

After obtaining the inspection-objective data Bi for the n lines, the CPU 41 conducts a data obtaining position relocating process as shown in FIG. 7 before a next time for obtaining the inspection-objective data Bi for n lines may arrive.

In the data obtaining position relocating process, in S41, the CPU 41 examines the inspection-objective data Bi for each of the pixels in the n lines and determines whether the inspection-objective data Bi for all of the pixels falls within the dispersal range, e.g., Bave±3 B$\sigma$. If the CPU 41 finds any inspection-objective data Bi outside the dispersal range, the CPU 41 determines the line containing the pixel(s), of which inspection-objective data Bi is outside the range, to be an unqualified line and stores the unqualified line in the ROM 42. In other words, the CPU 41 stores information to identify the unqualified line in the ROM 42.

In S42, the CPU 41 excludes the unqualified line from objective lines for reading, from which the inspection-objective data Bi is to be obtained, and stores another line as an objective line, from which the inspection-objective data Bi is to be obtained, in the ROM 42 by, for example, changing the location(s) of the second position or the third position. The CPU 41 ends the data obtaining position relocating process thereat. Thus, the inspection-objective data obtaining area between the second position being the starting position and the third position being the ending position is moved; therefore, when the CPU 41 obtains the inspection-objective data Bi for next n lines, the CPU 41 may obtain the white data Bi in the n lines contained in the inspection-objective data obtaining area having been moved, and the white data Bi obtained from the changed inspection-objective data obtaining area may be stored in the ROM 42 as the inspection-objective data.

<Benefits>

As described above, while the CIS unit 12 is located at the first position, adjustment of the light from the light source 21 and the reading action to read the image of the reference density plate 31 under the adjusted light amount are conducted to create the correction data A for the shading correction. As the CIS unit 12 is moved from the first position toward the read-standby position, in particular, while the CIS unit 12 is being moved from the second position to the third position, the reading actions to read the image of the reference density plate 31 by the CIS unit 12 are conducted for n times. Thereafter, in the correction data validity inspecting process, the inspection-objective data Bi obtained from the reading actions of n times is compared with the correction data A to inspect validity of the correction data A.

Through the inspection of the validity, the CPU 41 may obtain the correction data A, which may less likely be affected by dirt or smears staying on the reference density plate 31. Moreover, throughout reading actions that are conducted for n times while the CIS unit 12 moves from the second position to the third position, the CIS unit 12 may not be stopped each time for conducting the reading action. Therefore, compared to the reading apparatus, in which the CIS unit may be moved and stopped repeatedly for n times, the correction data A, which may less likely be affected by the dirt or smears staying on the reference density plate 31, may be created in shorter time.

In the correction data validity inspecting process, the CPU 41 may calculate the dispersal range of the inspection-objective data Bi for each of the pixels and determine whether the correction data A falls within the dispersal range. If the correction data A for all of the pixels fall in the dispersal range, the correction data A is all determined to be valid for a line; therefore, the correction data A may be used for the shading correction. Meanwhile, if the correction data A for some of the pixels do not fall in the dispersal range, not all the correction data A may be valid for a line. Therefore, the CPU 41 may calculate an average value among the upper half values in the inspection-objective data Bi for the pixel(s) and replace the correction data A for the pixel(s) with the calculated average value. Thus, the replaced correction data A may be used for the shading correction. In either way, the shading correction may be preferably applied to the image data obtained through the reading actions of the original document, and image data in higher quality may be obtained.

When the correction data A for at least part of the pixels in a line is replaced with the average value of the upper half values in the inspection-objective data Bi, the replacing correction data A may be stored in the ROM 42, and the old correction data A having been replaced may be deleted from the ROM 42. Therefore, a volume in the ROM 42 to be occupied may be reduced.

When the correction data A for the pixels is at least partly replaced with the average value of the upper half values in the inspection-objective data Bi, the first position, at which the CIS unit 12 obtains the correction data A, is moved to another location. Therefore, if the CIS unit 12 located at the original first position is to read a part of the reference density plate 31 having dirt or smears thereon, by moving the first position to another location, the CIS unit 12 may read another part of the reference density plate 31 that may have less dirt or smear staying thereon, and the correction data A that may be affected to a smaller extent by the dirt or smear may be created.

Further, the inspection-objective data Bi for each of the pixels throughout the n lines is examined, and when the inspection-objective data Bi for a pixel falling outside the dispersal range is found, the line containing the pixel, of which inspection-objective data Bi is outside the range, is determined to be an unqualified line, and the unqualified line is excluded from the object of a next reading action for obtaining the inspection-objective data Bi for next n lines. Therefore, the lines affected to a smaller extent by dirt or smear may be set as the object of the next reading actions for obtaining the inspection-objective data Bi, and validity of the correction data A may be determined correctly.

Moreover, obtainment of the inspection-objective data Bi and the correction data validity inspecting process are conducted in parallel with moving of the CIS unit 12 from the first position to the read-standby position. In other words, even with the obtainment of the inspection-objective data Bi and the correction data validity inspecting process, a length of time required for creating the correction data A may not be extended but may be the same as moving the CIS unit 12 from the first position to the read-standby position alone. Therefore, the time required for creating the correction data A may be restrained from being extended, yet the correction data A may be affected by dirt or smears to a smaller extent.

Moreover, in the range between the second position and the third position, the CIS unit 12 having been accelerated may move at the constant velocity. Therefore, inspection-objective data Bi may be obtained under a stable reading condition.

More Examples

Although an example of carrying out the invention has been described, those skilled in the art will appreciate that there are numerous variations and permutations of the recording apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, when the correction data A is at least partly replaced with the average value of the upper half values in the inspection-objective data Bi, the new correction data A for the entire line may not necessarily be stored in the ROM 42 to replace the existing correction data A for the entire line: in other words, the existing correction data A for the line may not necessarily be deleted entirely from the ROM 42, but a part of the existing correction data A may remain stored in the ROM 42. That is, for pixels corresponding to the correction data A determined to fall in the dispersal range, the existing correction data A may be used; and for pixels corresponding to the correction data A determined to fall outside the dispersal range, the correction data A replaced with the average value of the upper half values of the inspection-objective data B1 may be used, to create new correction data A for a line.

For another example, when an unqualified line is excluded from the object of the reading actions to obtain the inspection-objective data Bi for a next time, the locations of the second position and the third position may not necessarily be moved in order to increase the number of the objective lines for the reading action and to obtain the inspection-objective data Bi from new line(s). For example, the distance between the second position and the third position may be enlarged to be larger than the inspection-objective data obtaining area, and new line(s), of which number is equal to a number of the unqualified line(s), outside the original inspection-objective data obtaining area between the second position and the third position may be added to the original objective lines for the reading actions.

What is claimed is:

1. A reading apparatus, comprising:
   a document supporting part comprising a plane surface for supporting an original document;
   a reader arranged on a side of the document supporting part opposite to the plane surface, the reader comprising a light source configured to emit light at a reading object and an image sensor configured to convert the light reflected on the reading object into signals, the reader being configured to read a line of the reading object;
   a driving mechanism configured to move the reader in parallel to the plane surface;
   a reference density plate arranged at a position different from the document supporting part in a moving direction for the reader to be moved; and
   a controller configured to:
      control the reader located at a first position to perform a first reading action to read the reference density plate being the reading object and adjust an amount of the light from the light source in accordance with the signals resulted from the first reading action and output from the reader;
      control the reader located at the first position to perform a second reading action to read the reference density plate under the light emitted in the adjusted amount from the light source and create correction data for shading correction based on the signals resulted from the second reading action and output from the reader; and
      control the driving mechanism to move the reader from the first position through a second position and a third position toward a standby position, the standby position being located to be closer than the first position to the document supporting part, control the reader while being moved from the second position toward the third position to perform a third reading action, the third reading action including a plurality of reading actions to read the reference density plate being the reading object for a plurality of times under the light emitted in the adjusted amount from the light source, and inspect validity of the correction data having been created by comparing read data obtained from the signals resulted from the plurality of reading actions in the third reading action and output from the reader.

2. The reading apparatus according to claim 1,
   wherein the controller is configured to inspect the validity of the correction data by calculating a dispersal range for values of the read data for each of pixels and determining whether the correction data for each of the pixels falls in the dispersal range; and
   wherein, if the correction data for all of the pixels falls in the dispersal range, the controller determines that the correction data for a line to be read by the reader is valid, but if the correction data for any of the pixels falls outside the dispersal range, the controller determines that the correction data for the line to be read by the reader is invalid.

3. The reading apparatus according to claim 2,
   wherein, if the controller determines that the correction data for the line is invalid, the controller is configured to calculate an average value of upper half values in the read data for the pixel corresponding to the correction data falling outside the dispersal range and replace the correction data with data corresponding to the average value.

4. The reading apparatus according to claim 3,
   wherein, if the controller determines that the correction data for the line is valid, the controller is configured to use the correction data for the line in the shading correction, but if the controller determines that the correction data for the line is invalid, the controller is configured to use the correction data replaced with the data corresponding to the average value for the line in the shading correction.

5. The reading apparatus according to claim 2,
   wherein, if the controller determines that the correction data for the line is invalid, the controller is configured to create new correction data for the line to be used in the shading correction separately from the correction data created based on the signals resulted from the second reading action, the new correction data being created with use of:
      for a part of the pixels corresponding to the correction data falling in the dispersal range, the correction data created based on the signals resulted from the second reading action; and
      for another part of the pixels corresponding to the correction data falling outside the dispersal range, an average value of upper half values in the read data for each pixel in the another part of the pixels corresponding to the correction data falling outside the dispersal range.

6. The reading apparatus according to claim 5,
   wherein, if the controller determines that the correction data for the line is valid, the controller is configured to use the correction data for the line created based on the signals resulted from the second reading action in the shading correction, but if the controller determines that the correction data for the line is invalid, the controller is configured to use the new correction data.

7. The reading apparatus according to claim 1,
   wherein, if the controller determines that the correction data for the line is invalid, the controller is configured to relocate the first position to another location.

8. The reading apparatus according to claim 1, further comprising a memory,
   wherein the controller is configured to determine whether the read data for each of the pixels falls in a dispersal range for the read data and store a line containing a pixel corresponding to the read data falling outside the dispersal range in the memory; and wherein the controller excludes the line stored in the memory from the reading object in the third reading action.

9. The reading apparatus according to claim 1,
wherein the controller is configured to inspect validity of the correction data in parallel with the control of the reader to be moved from the second position to the standby position.

10. The reading apparatus according to claim 1,
wherein a range from the second position to the third position is a range, in which the driving mechanism having been accelerated moves at a constant velocity for moving the reader from the first position toward the standby position.

* * * * *